United States Patent [19]

Luenser

[11] Patent Number: 5,685,439

[45] Date of Patent: Nov. 11, 1997

[54] DISPLAY FRAME/INTERLOCKING STORAGE RACK COMPONENT

[76] Inventor: Carl D. Luenser, 12757 Mozart St., Blue Island, Ill. 60406-1920

[21] Appl. No.: 489,148

[22] Filed: Jun. 9, 1995

[51] Int. Cl.$^6$ .................................................. B66C 23/42
[52] U.S. Cl. ........................... 211/183; 211/194; 211/40
[58] Field of Search ............................... 211/194, 40, 41, 211/183

[56] References Cited

U.S. PATENT DOCUMENTS

| | | | |
|---|---|---|---|
| 3,655,065 | 4/1972 | Yellin | 211/194 |
| 3,907,116 | 9/1975 | Wolf | 211/40 |
| 5,048,702 | 9/1991 | Maloney | 211/194 |
| 5,191,983 | 3/1993 | Hardy | 211/194 |
| 5,253,751 | 10/1993 | Wipper | 206/45.19 |
| 5,285,907 | 2/1994 | Franchere | 211/194 |
| 5,289,918 | 3/1994 | Dobias et al. | 206/312 |
| 5,289,925 | 3/1994 | Newmark | 211/40 |
| 5,295,577 | 3/1994 | Minter | 206/309 |

Primary Examiner—Ramon O. Ramirez
Assistant Examiner—Gwendolyn W. Baxter
Attorney, Agent, or Firm—Richard L. Miller

[57] ABSTRACT

An interlocking storage component with viewing capabilities that includes a top portion, a pair of side portions, a back portion, and a pair of tracks. The top portion contains a top portion opening and has a top portion back and a pair of top portion sides. Each of the pair of side portions are disposed at a side of the pair of top portion sides and extend downwardly therefrom. The back portion is disposed at the top portion back and extends downwardly therefrom. The back portion connects the pair of side portions. The top portion and the pair of side portions and the back portion define a housing that has a housing open front, a housing open bottom and contains a housing chamber. The pair of tracks are attached to the top portion and are contained within the housing chamber. The pair of tracks are spaced a distance from the pair of portions and the back portion so that an object for storage that is inserted through the housing open front onto the pair of tracks is free of any impact incurred by the pair of side portions and the back portion and will be visible through the top portion opening and the housing open front.

3 Claims, 1 Drawing Sheet

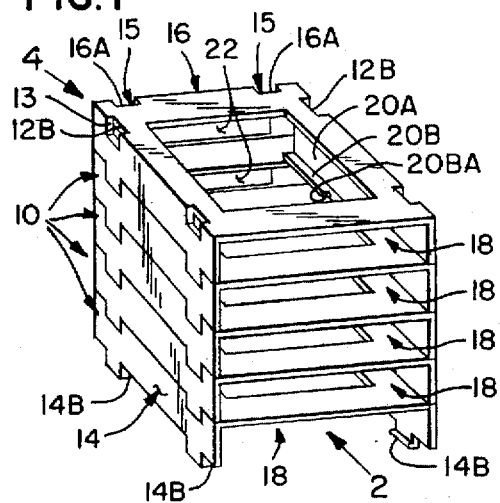
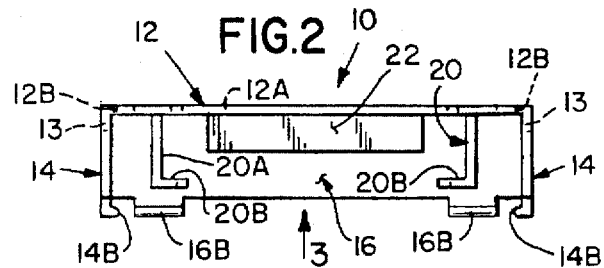
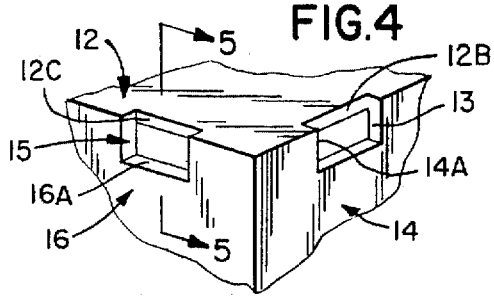
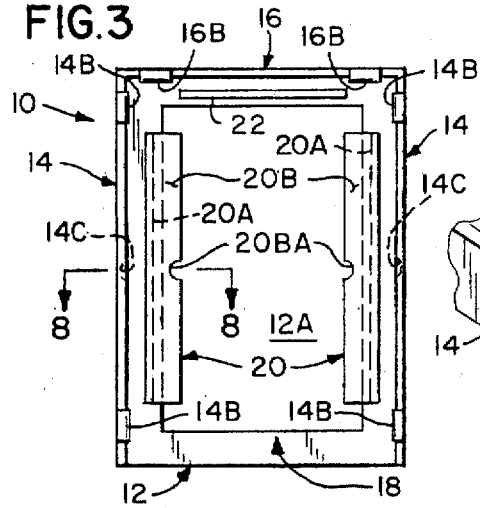
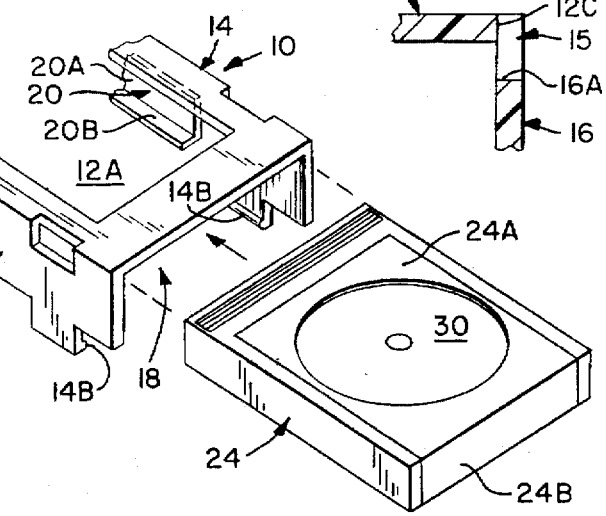
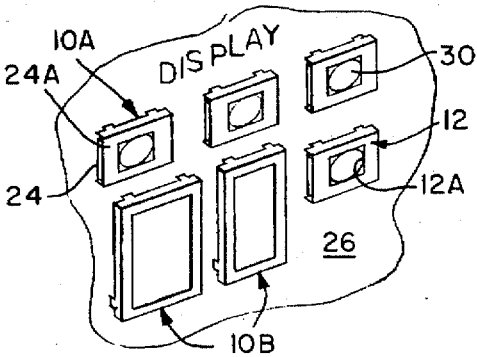
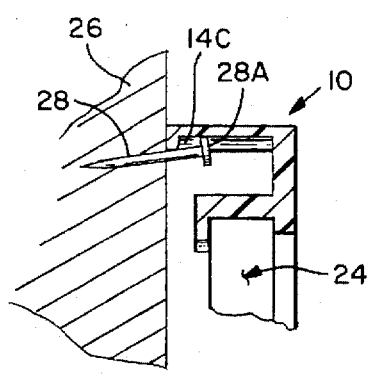

DISPLAY FRAME/INTERLOCKING STORAGE RACK COMPONENT

BACKGROUND OF THE INVENTION

The present invention relates to a storage rack component. More particularly, the present invention relates to a storage rack component that is interlockable and displays at least two surfaces of each of the objects it contains.

People like to decorate their personal spaces with items they find appealing. Movie posters and pictures of recording and film stars often find their place on the walls of fans. The package which contains the pre-recorded music or video has been artfully and carefully designed to be appealing to the consumer. The art work identifies the product and the package contents. There are approximately 500 million compact discs sold annually in the domestic market with a slightly lesser number of pre-recorded audio cassettes and a large number of pre-recorded video cassettes. The public has come to appreciate and collect this pre-recorded entertainment and has developed an outstanding inventory. The collectors of pre-recorded music and videos can listen to the artist on their stereo or view a movie on their television but have no way to make use of the package art work for decoration purposes.

Numerous innovations for storage rack components have been provided in the prior art that will be described. However, even though these innovations may be suitable for the specific individual purposes to which they address, they differ from the present invention in that they do not provide a storage rack component that is interlockable, stores each of the objects it contains in a recessed portion, and displays at least two surfaces of each of the objects it contains.

For example, U.S. Pat. No. 5,253,751 to Wipper teaches a package for the retail display of a compact disc that includes a base hingedly connected to the cover of a conventional jewel box, and a tray in which the disc is removably stored by a circular array of flexible fingers. A narrow slot is formed in the elevated portion which extends along its entire length.

Another example, U.S. Pat. No. 5,289,918 to Dobias et al. teaches an unitary sheet storage container for a compact disc. The container has a disc holder panel that enables the insertion of a compact disc down into the disc holder panel which holds the disc at four points on its outer periphery.

Still another example, U.S. Pat. No. 5,289,925 to Newmark teaches a display for organizing the cases of compact discs which allows viewing of a part of only the front face of the package.

Finally, an example, U.S. Pat. No. 5,295,577 to Minter teaches an upwardly opening tray for storing compact disc packages. Cooperatively interactive guide formations are defined by the tray and the disc holders.

It is apparent that numerous innovations for storage rack components have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a display frame/interlocking storage component that avoids the disadvantages of the prior art.

Another object of the present invention is to provide a display frame/interlocking storage component that is simple and inexpensive to manufacture.

Still another object of the present invention is to provide a display frame/interlocking storage component that is simple to use.

Yet another object of the present invention is to provide a display frame/interlocking storage component that includes a top portion, a pair of side portions, a back portion, and a pair of tracks.

Still yet another object of the present invention is to provide a display frame/interlocking storage component wherein the top portion contains a top portion opening and has a top portion back and a pair of top portion sides.

Yet still another object of the present invention is to provide a display frame/interlocking storage component wherein each of the pair of side portions are disposed at a side of the pair of top portion sides and extend downwardly therefrom.

Still yet another object of the present invention is to provide a display frame/interlocking storage component wherein the back portion is disposed at the top portion back and extends downwardly therefrom.

Yet still another object of the present invention is to provide a display frame/interlocking storage component wherein the back portion connects the pair of side portions.

Still yet another object of the present invention is to provide a display frame/interlocking storage component wherein the top portion and the pair of side portions and the back portion define a housing that has a housing open front, a housing open bottom and contains a housing chamber.

Yet still another object of the present invention is to provide a display frame/interlocking storage component wherein the pair of tracks are attached to the top portion and are contained within the housing chamber.

Still yet another object of the present invention is to provide a display frame/interlocking storage component wherein the pair of tracks are spaced a distance from the pair of portions and the back portion so that an object for storage that is inserted through the housing open front onto the pair of tracks is free of any impact incurred by the pair of side portions and the back portion and will be visible through the top portion opening and the housing open front.

Yet still another object of the present invention is to provide a display frame/interlocking storage component wherein each of the side portions have a side portion bottom with at least one side portion bottom interlocking tab disposed thereon.

Still yet another object of the present invention is to provide a display frame/interlocking storage component wherein each of the side portions have a side portion top with at least one side portion top interlocking notch contained therein.

Yet still another object of the present invention is to provide a display frame/interlocking storage component wherein the at least one side portion bottom interlocking tab is positioned in alignment with the at least one side portion top interlocking notch.

Still yet another object of the present invention is to provide a display frame/interlocking storage component wherein the back portion has a back portion bottom with at least one back portion bottom interlocking tab disposed thereon.

Yet still another object of the present invention is to provide a display frame/interlocking storage component wherein the back portion has a back portion top with at least one back portion top interlocking notch contained therein.

Still yet another object of the present invention is to provide a display frame/interlocking storage component wherein the back portion bottom interlocking tab is positioned in alignment with the back portion top interlocking notch.

Yet still another object of the present invention is to provide a display frame/interlocking storage component wherein each of the top portion sides contain at least one top portion side interlocking notch that opens into the at least one side portion top interlocking notch.

Still yet another object of the present invention is to provide a display frame/interlocking storage component wherein the top portion back contain at least one top portion back interlocking notch that opens into the at least one back portion top interlocking notch.

Yet still another object of the present invention is to provide a display frame/interlocking storage component that further includes a back stop disposed on the top portion and contained in the housing chamber.

Still yet another object of the present invention is to provide a display frame/interlocking storage component wherein each of the pair of tracks is a substantially "L"-shaped member that has a track vertical part and a track horizontal part that extends inwardly.

Yet still another object of the present invention is to provide a display frame/interlocking storage component wherein each of the at least one side portion bottom interlocking tabs and each of the at least one back portion interlocking bottom tabs is a substantially "L"-shaped member that has an interlocking tab vertical part and an interlocking tab horizontal part that extends inwardly.

Still yet another object of the present invention is to provide a display frame/interlocking storage component wherein each of the side portions has a height that is greater than the height of each of the track vertical parts.

Yet still another object of the present invention is to provide a display frame/interlocking storage component wherein the top portion, the pair of side portions, the back portion, and the stop are an integrally formed structure.

Still yet another object of the present invention is to provide a display frame/interlocking storage component wherein the integrally formed structure is injection molded.

Yet still another object of the present invention is to provide a display frame/interlocking storage component wherein the injection molded integrally formed structure is thermal plastic.

Still yet another object of the present invention is to provide a display frame/interlocking storage component wherein at least one of the pair of sides has a side bottom that contains a notch.

Yet still another object of the present invention is to provide a display frame/interlocking storage component wherein at least one of the track horizontal part contains a notch.

Still yet another object of the present invention is to provide a method for stacking a plurality of interlocking storage component with viewing capabilities that includes the steps of positioning the interlocking storage component with viewing capabilities at a desired position, positioning a subsequent interlocking storage component with viewing capabilities atop the first interlocking storage component with viewing capabilities, interlocking at least one interlocking tab disposed on the sides of the bottom of the subsequent interlocking storage component with viewing capabilities with at least one interlocking notch contained on the sides of the top of the interlocking storage component with viewing capabilities, interlocking at least one interlocking tab disposed on the back of the bottom of the subsequent interlocking storage component with viewing capabilities with at least one interlocking notch contained on the back of the top of said interlocking storage component with viewing capabilities, and repeating steps the above steps until stacking the desired number of interlocking storage component with viewing capabilities is achieved.

Finally, an object of the present invention is to provide a method of using an interlocking storage component with viewing capabilities that includes the steps of positioning an object having an object decorated top and an object decorated front at the open front contained in the interlocking storage component with viewing capabilities, inserting the object passed the open front and onto the pair of tracks disposed in the interlocking storage component with viewing capabilities until the object reaches the back stop disposed in the interlocking storage component with viewing capabilities, terminating longitudinal movement of the object, restricting lateral movement of the object by the pair of tracks, viewing the object decorated top of the object through the top portion opening contained in the top of the interlocking storage component with viewing capabilities, viewing the object decorated front of the object through the open front of the interlocking storage component with viewing capabilities, and protecting the object from impact incurred to the pair of sides and the back of the interlocking storage component with viewing capabilities by utilizing the recessed arrangement afforded by the placement of the pair of tracks and the back stop of the interlocking storage component with viewing capabilities.

The novel features which are considered characteristic of the present invention are set forth in the appended claims. The invention itself, however, both as to its construction and method of operation, together with additional objects and advantages thereof, will be best understood from the following description of the specific embodiments when read and understood in connection with the accompanying drawing.

BRIEF DESCRIPTION OF THE DRAWING

FIG. 1 is a diagrammatic perspective view of a plurality of units of the instant invention stacked for compact storage, FIG. 2 is an enlarged end view taken in the direction of arrow 2 in FIG. 1 of just a single unit per se;

FIG. 3 is a bottom elevational view taken in the direction of arrow 3 in FIG. 2;

FIG. 4 is an enlarged perspective view with parts broken away taken generally in the direction of arrow 4 in FIG. 1 of a corner of a single unit per se;

FIG. 5 is a cross sectional view with parts broken away taken on line 5—5 of FIG. 4;

FIG. 6 is a diagrammatic exploded perspective view of a typical CD-ROM box, or tape cassette case being loaded into the instant invention;

FIG. 7 is a diagrammatic perspective view of a set of the instant invention being used to store and display recorded media typically CD-ROMs and tape cassettes; and FIG. 8 is an enlarged cross sectional view taken in line 8—8 in FIG. 3 illustrating a single unit per se hanging on a nail driven in a wall.

LIST OF REFERENCE NUMERALS UTILIZED IN THE DRAWING 10-display frame/interlocking storage rack component of the present invention 10A-display frame/interlocking storage rack component of the present invention with a CD-ROM box stored therein
10B-display frame/interlocking storage rack component of the present invention with a tape cassette box stored therein
12-top portion
12A-top portion opening
12B-top portion side interlocking notches
12C-top portion back interlocking notches
13-side interlocking notches
14-pair of sides
14A-side top interlocking notches
14B-side bottom interlocking tabs
14C-side bottom recess
15-back interlocking notches
16-back portion
16A-back portion top interlocking notches
16B-back portion bottom interlocking tabs
18-open front
20-pair of tracks
20A-track vertical part
20B-track horizontal part
BA-track horizontal part recess
22-back stop
24-CD-ROM box
24A-CD-ROM box decorated top
24B-CD-ROM box decorated front
26-wall
28-nail
28A-nail head
30-CD-ROM

DETAILED DESCRIPTION OF THE PREFERRED EMBODIMENT

Referring now to the figures in which like numerals indicate like parts, and particularly to FIG. 1, a single display frame/interlocking storage rack component of the present invention is shown generally at 10 interlocked in a stacked configuration.

The configuration of the single display frame/interlocking storage rack component 10 can best be seen in FIGS. 1-5, and as such will be discussed with reference thereto.

The single display frame/interlocking storage rack component 10 is an integrally formed unit manufactured form thermal plastic in an injection molding process. The single display frame/interlocking storage rack component 10 includes a top portion 12 containing a top portion opening 12A, a pair of side portions 14, a back portion 16, an open front 18, a pair of tracks 20, and a back stop 22.

The pair of side portions 14 extend downward from and span the entire length of the sides of the top portion 12. The back portion 16 extends downward from and spans the entire width of the back of the top portion 12 and is joined to an end of each side portion of the pair of side portions 14. The back portion 16 and the pair of side portions 14 are equal in height.

The pair of tracks 20 extend downward from the top portion 12 at a height less than the height of the back portion 16 and the pair of side portions 14. Each track of the pair of tracks 20 is disposed intermediate each of the pair of side portions 14 and the top portion opening 12A and span a length less than the length of the top portion 12.

The back stop 22 is disposed intermediate the back portion 16 and the top portion opening 12A, spans less than the distance between the pair of tracks 20, and has a height less than the height of the pair of tracks 20. The back stop 22 and the pair of tracks 20 from a receptacle that is free of intervention from the back portion 16 and the pair of side portions 14.

Each side of the top portion 12 contains a pair of top portion side interlocking recesses 12B that are disposed at a distance from each other and are intermediate the open front 18 and the back portion 16. Each pair of top portion side interlocking recesses 12B open into each of the pair of side portions 14 but terminate prior to the top portion opening 12A. The back of the top portion 12 contains a pair of top portion back interlocking recesses 12C that are disposed a distance from each other and are intermediate the pair of side portions 14. The pair of top portion back interlocking recess 12C open into the back portion 16 but terminate prior to the top portion opening 12A.

The top of each of the pair of side portions 14 contains a pair of side portion top interlocking recesses 14A that are disposed at a distance from each other and are intermediate the open front 18 and the back portion 16. The pair of side portion top interlocking recesses 14A originate prior to the bottom of each of the side portions 14 and open into the pair of top portion side recesses 12B forming interlocking notches 13 therewith.

The bottom of each of the pair of side portions 14 has a pair of side portion bottom inward projecting interlocking tabs 14B that are disposed at a distance from each other and are in alignment with the pair of side portion top interlocking recesses 14A. A side portion bottom hanging recess 14C is contained at the center of the bottom of each of the pair of side portions 14.

The top of the back portion 16 contains a pair of back portion top interlocking recesses 16A that are disposed at a distance from each other and are intermediate the pair of side portions 14. The pair of back portion top interlocking recesses 16A originate prior to the bottom of the back portion 16 and open into the pair of top portion back recesses 12C forming interlocking notches 15 therewith.

The bottom of the back portion 16 has a pair of back portion bottom inward projecting interlocking tabs 16B that are disposed at a distance from each other and are in alignment with the pair of back portion top interlocking recesses 16A.

Each of the pair of tracks 20 is a substantially "L"-shaped member that has a track vertical part 20A and a track horizontal part 20B that projects inwardly towards the top portion opening 12A. A track horizontal part inward recess 20BA is contained at the center of the inward edge of each track horizontal part 20B.

The method of loading the display frame/interlocking storage rack component 10 can best be seen in FIGS. 1-3, and 6, and as such, will be discussed with reference thereto.

For the matter of simplicity the discussion will make reference to the use of a CD-ROM box, but it is to be understood that it's use is not limited to that since the display frame/interlocking storage rack component 10 can be manufactured in a wide range of sizes and can therefore accommodate boxes for other objects, such as, video tape cassettes, audio tape cassettes, and the like, some of which are illustrated in FIG. 7.

A CD-ROM box 24 having a CD-ROM box decorated top 24A and a CD-ROM box decorated front 24B is positioned at the open front 18. The CD-ROM box 24 is inserted passed the open front 18 and onto the pair of tracks 20 until it reaches the back stop 22 which terminates its longitudinal movement. In this position the CD-ROM box decorated top 24A is visible through the top portion opening 12A and the CD-ROM box decorated front 24B is visible through the open front 18.

The pair of sides 14 restrict the CD-ROM box 24 from lateral movement. With the recessed arrangement afforded by the positioning of the back stop 22 relative to the back portion 16, and the positioning of the pair of tracks 20 relative to the pair of sides 14, the CD-ROM box 24 is protected from any impact incurred by the back portion 16 and the pair of side portions 14.

The stacking arrangement of the display frame/interlocking storage rack component 10 can best be seen in FIGS. 1, and 4, and as such, will be discussed with reference thereto.

A first display frame/interlocking storage rack component 10 is positioned where desired. A second display frame/interlocking storage rack component 10 is positioned atop the first display frame/interlocking storage rack component 10 with the two pair of side portion bottom interlocking tabs 14B interlocking with the two pair of interlocking notches 13 and the pair of back portion bottom interlocking tabs 16B interlocking with the pair of back portion interlocking notches 15. Subsequent units of the display frame/interlocking storage rack component 10 can be added in a similar matter.

The method for hanging the display frame/interlocking storage rack component 10 can best be seen in FIGS. 7 and 8, and as such, will be discussed with reference thereto.

A nail 28 is put into a wall 26 at the position the display frame/interlocking storage rack component 10 and the CD-ROM box 24 contained therein is to be placed. The display frame/interlocking storage rack component 10 is held sideways so that the CD-ROM box 24 can not escape through the open front 18. The display frame/interlocking storage rack component 10 is placed over the nail 28 with the side portion bottom recess 14C resting on the nail 28. The nail head 28 prevents the display frame/interlocking storage rack component 10 from sliding off of the nail 28. In this arrangement the CD-ROM box decorated top 24A forms a picture that is viewed through the top portion opening 12A and framed by the remaining top portion 12.

It will be understood that each of the elements described above, two or more together, may also find a useful application in other typed of constructions differing from the typed described above.

While the invention has been illustrated and described as embodied in display frame/interlocking storage rack component, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

The invention claimed is:

1. An interlocking storage component with viewing capabilities, comprising:

a) a top portion being rectangular-shaped and having an opening therein being rectangular-shaped and defined by a front, a back, and a pair of sides; said top portion further having a pair of sides with lengths, a back with an entire length, and a front; said back of said opening in said top portion being parallel to, having a length less than, and being inboard of, said back of said top portion; said front of said opening in said top portion being parallel to, having a length less than, and being inboard of, said front of said top portion; said pair of sides of said opening in said top portion being parallel to, having a length less than, and being inboard of, said pair of sides of said top portion; each side of said pair of sides of said top portion having a pair of top side interlocking recesses being rectangular-shaped, spaced apart, and extending slightly inwardly therefrom to short of a respective side of said pair of sides of said opening in said top portion; one top side interlocking recess of said pair of top side interlocking recesses in a respective side of said pair of sides of said top portion being disposed short of said back of said top portion and extending slightly forwardly and slightly rearwardly of said back of said opening in said top portion; another top side interlocking recess of said pair of top side interlocking recesses in said respective side of said pair of sides of said top portion being disposed short of said front of said top portion and extending slightly forwardly and slightly rearwardly of said front of said opening in said top portion; said back of said top portion having a pair of top back interlocking recesses being rectangular-shaped, spaced apart, and extending slightly inwardly therefrom short of said back of said opening in said top portion; one top back interlocking recess of said pair of top back interlocking recesses in said back of said top portion being disposed short of one side of said pair of sides of said top portion and extending slightly outwardly and slightly inwardly of one side of said pair of sides of said opening in said top portion; another top back interlocking recess of said pair of top back interlocking recesses in said back of said top portion being disposed short of another side of said pair of sides of said top portion and extending slightly outwardly and slightly inwardly of another side of said pair of sides of said opening in said top portion;

b) a pair of side portions being rectangular-shaped and extending perpendicularly downwardly from, and spanning said entire lengths of, said pair of sides of said top portion; said pair of side portions having heights, front ends, back ends and bottoms; each side of said pair of side portions having a pair of side interlocking recesses being rectangular-shaped, spaced apart, and extending slightly downwardly from, and opening into, a respective pair of top side interlocking recesses in said top portion short of said bottom of a respective side portion of said pair of side portions; one side interlocking recess of said pair of side interlocking recesses in said respective side portion of said pair of side portions opening into one top side interlocking recess of said pair of top side interlocking recesses in said respective side of said pair of sides of said top portion and being disposed short of said back end of said respective side portion of said pair of side portions and extending slightly forwardly and slightly rearwardly of said back of said opening in said top portion; another side interlocking recess of said pair of side interlocking recesses in said respective side portion of said pair of side portions opening into another top side interlocking recess of said pair of top side interlocking recesses in said respective side of said pair of sides of said top portion and being disposed short of said front end of said respective side portion of said pair of side portions and extending slightly forwardly and slightly rearwardly of said front of said opening in said top portion;

c) a back portion being rectangular-shaped and extending perpendicularly downwardly from, and spanning said entire length of, said back of said top portion and being perpendicularly joined to said back ends of said pair of side portions; said back portion having a height equal to said heights of said pair of side portions, ends, and a bottom; said top portion, said pair of side portions, and said back portion forming a chamber having an open front; said back portion having a pair of back interlocking recesses being rectangular-shaped, spaced apart, and extending slightly downwardly from, and opening into, said pair of top back interlocking recess in said top portion to short of said bottom of said back portion; one back interlocking recess of said pair of back interlocking recesses in said back portion opening into one top back interlocking recess of said pair of top back recesses in said top portion and being disposed short of an end of said ends of said back portion and extending slightly outwardly and slightly inwardly of one side of said pair of sides of said opening in said top portion; another back interlocking recess of said pair of back interlocking recesses in said back portion opening into another top back interlocking recess of said pair of top back recesses in said top portion and being disposed short of another end of said ends of said back portion and extending slightly outwardly and slightly inwardly of another side of said pair of sides of said opening in said top portion;

d) a pair of tracks being L-shaped and having vertical portions with heights, and horizontal portions extending perpendicularly inwardly from said vertical portions of said pair of tracks and spanning said entire lengths of said vertical portions of said pair of tracks; said vertical portions of said pair of tracks extending perpendicularly downwardly from said top portion to a height less than said height of said back portion and said heights of said pair of side portions; each vertical portion of said vertical portions of a respective track of said pair of tracks extending perpendicularly downwardly from said top portion at a position parallel to, and between, a respective side portion of said pair of side portions and a respective side of said pair of sides of said opening in said top portion so as to allow said vertical portions of said pair of tracks to be free of said pair of side portions and thereby allowing an object for storage inserted through said open front of said chamber and onto said pair of tracks to be free of any impact incurred by said pair of side portions and be visible through said opening in said top portion; said horizontal portions of said pair of tracks extending perpendicularly inwardly from said vertical portions of said pair of tracks to a distance slightly past said pair of sides of said opening in said top portion; said pair of tracks spanning from short of said back of said opening in said top portion to short of said front of said opening in said top portion so as to allow said pair of tracks to be free of said back portion;

e) a back stop having a bottom and being rectangular-shaped and extending perpendicularly downwardly from said top portion to a height less than said heights of said vertical portions of said pair of tracks; said back stop extending perpendicularly downwardly from said top portion at a position between, and parallel to, said back of said top portion and said back of said opening in said top portion so as to allow said back stop to be free of said back portion and thereby allowing the object for storage inserted through said open front of said chamber and onto said pair of tracks to be free of any impact incurred by said back portion and be visible through said opening in said top portion; said back stop spanning less than said back of said opening in said top portion so as to allow said back stop to be free of said pair of side portions; said pair of tracks and said back stop forming a receptacle communicating with said open front of said chamber so as to allow access to said receptacle from said open front of said chamber;

f) two pair of side tabs being L-shaped and having vertical portions and horizontal portion extending perpendicularly inwardly from said vertical portions of said two pair of side tabs; each pair of side tabs being spaced apart and having their vertical portions extending slightly downwardly from said bottom of a respective side portion of said pair of side portions and coplanarly with said respective side portion of said pair of side portions and being in alignment with said pair of side interlocking recesses in said respective side portion of said pair of side portions; and g) a pair of back tabs being L-shaped and having vertical portions and horizontal portion extending perpendicularly inwardly from said vertical portions of said pair of back tabs; said pair of back tabs being spaced apart and having their vertical portions extending slightly downwardly from said bottom of said back portion and coplanarly with said back portion and being in alignment with said pair of back interlocking recesses in said back portion.

2. The component as defined in claim 1, wherein said interlocking storage component with viewing capabilities is integrally formed from injection molded thermal plastic.

3. The component as defined in claim 1, said bottom of each side portion of said pair of side portion has at centers thereof hanging recesses.

* * * * *